June 16, 1953  E. W. BROWN  2,642,167
AUTOMATIC CLUTCH

Filed March 2, 1951  2 Sheets-Sheet 1

Inventor
Earl W. Brown
By Stone, Boyden & Mack,
Attorneys.

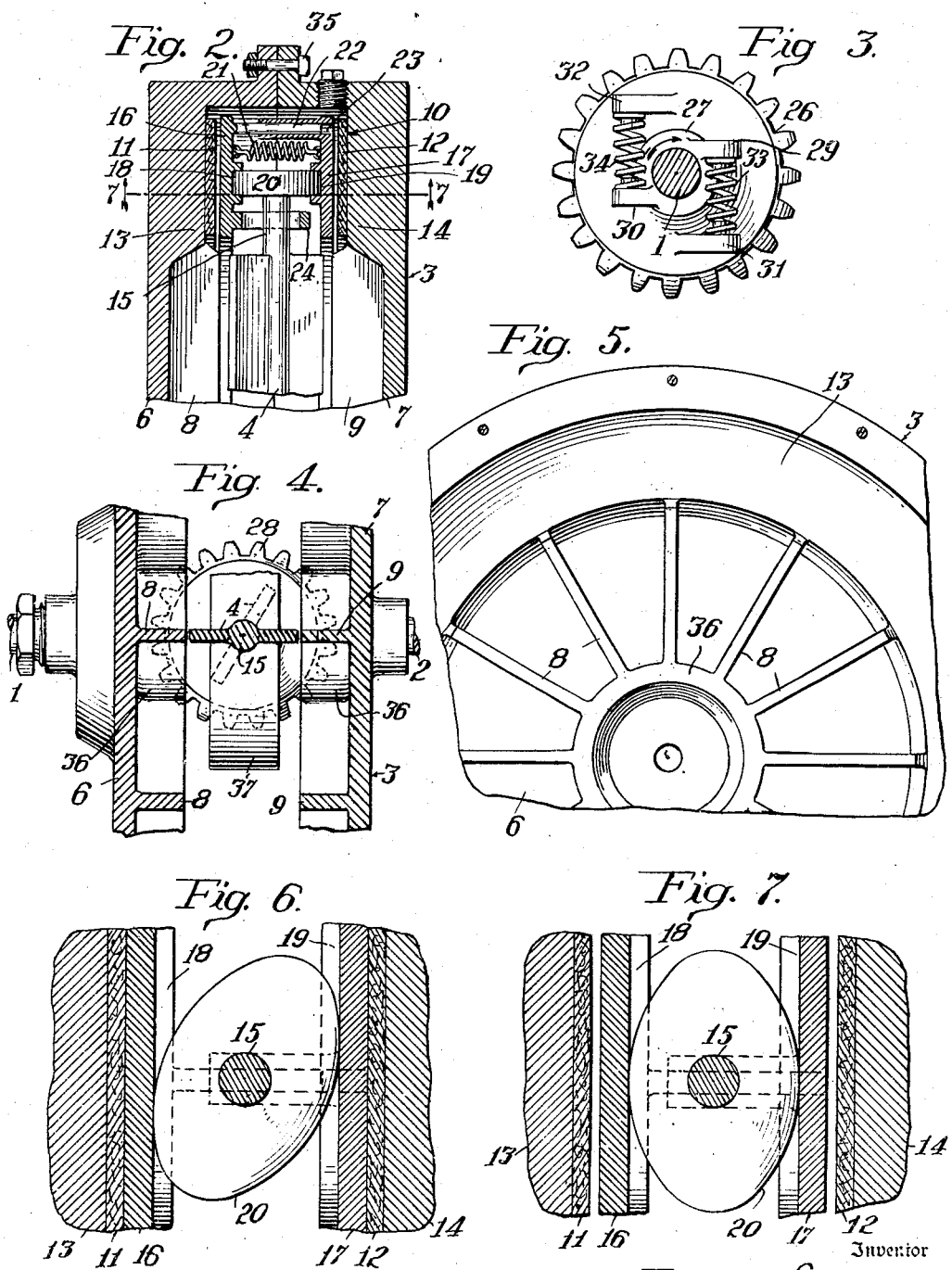

Patented June 16, 1953

2,642,167

UNITED STATES PATENT OFFICE 2,642,167

AUTOMATIC CLUTCH

Earl W. Brown, Miami, Fla.

Application March 2, 1951, Serial No. 213,613

8 Claims. (Cl. 192—3.2)

This invention relates to clutches for establishing a driving connection between two shafts, and particularly to fully automatic torque responsive clutches embodying a fluid coupling which allows a substantially free slip connection for conditions of low torque.

A general object of my invention is to provide a fully automatic clutch, requiring no exterior control mechanism, which affords substantially free slip under low torque conditions and a solid coupling with no slippage under high torque conditions.

Another object of my invention is the provision of a fully automatic torque and speed responsive clutch incorporating a fluid coupling, which coupling acts as a free slip connection under conditions of low torque, and a friction clutch, along with actuating means for causing the friction clutch to engage to provide a solid coupling in response to increasing torque.

A further object is to devise such an automatic clutch which is particularly applicable to automotive use and which, when constructed in accordance with a preferred embodiment, accomplishes automatic free-wheeling.

Yet another object of the invention is to provide an automatic torque responsive clutch of the type described which will allow effectively complete disengagement of the driving and driven shafts under low torque conditions, so that the clutch may be used in automotive vehicles in combination with a manually operated speed-change transmission without necessitating manual control of the clutch.

Stated broadly, the present invention comprises the combination of a fluid-tight casing connected to either the driving or driven shaft and provided with a plurality of radially extending interior vanes, a rotor unit connected to the other shaft and provided with a plurality of vanes extending radially of the casing and co-operating with the vaned casing to form a fluid coupling, a normally disengaged friction clutch for connecting the rotor and the casing, and means responsive to increased fluid resistance in the fluid coupling to cause friction clutch to engage to provide a solid driving connection between the rotor and the casing. In accordance with the preferred structure which will be described, the rotor unit includes a differential gearing so designed as to allow the rotor vanes of the fluid coupling to rotate about their longitudinal axes as the fluid resistance in the fluid coupling increases with speed. To actuate the friction clutch, cam means are provided which operate in response to such rotation of the rotor vanes.

In order that the invention may be readily understood, reference is had to the accompanying drawings which form a part of this specification and wherein:

Fig. 2 is a fragmentary longitudinal sectional view similar to Fig. 1 but showing the relation of the operating parts of the device when the friction clutch is disengaged;

Fig. 3 is a detailed elevational view of a portion of the differential gear mechanism of the rotor unit of my device, including resilient means for biasing the differential gearing to a given initial position;

Fig. 4 is a fragmentary transverse sectional view taken on the line 4—4, Fig. 1;

Fig. 5 is a fragmentary elevational view showing a portion of one-half of the casing and the fixed vanes thereon;

Fig. 6 is a fragmentary transverse sectional view taken on the line 6—6, Fig. 1, and Fig. 7 is a similar fragmentary transverse sectional view taken on the line 7—7, Fig. 2.

Figure 1:
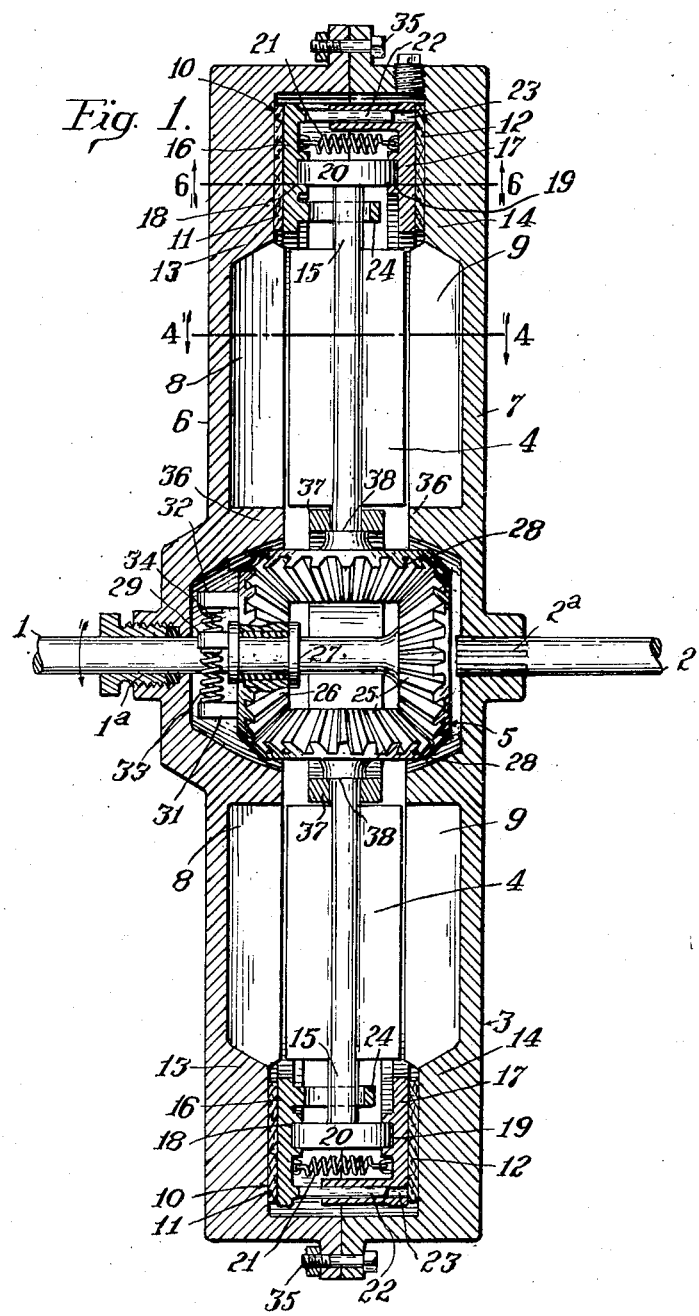
Fig. 1 is a longitudinal sectional view of the preferred embodiment of my improved device, showing the friction clutch thereof fully engaged.

As will be clear from the detailed description which follows, the fluid coupling comprises a vaned casing and a vaned rotor so arranged that, as the speed of relative rotation between the casing and the rotor, either of which may be the driving member, increases, the fluid resistance against such relative rotation also increases, tending to retard the driving member. It will of course be realized that such increase in fluid resistance results in a driving action between the rotor and casing. In the present invention, the fluid coupling serves not only as means for establishing an initial driving action but also as torque responsive means for operating the actuating mechanism for a friction clutch.

Referring now to the drawings in detail, and first to Fig. 1 thereof, it will be seen that the embodiment of the invention there shown comprises aligned shafts 1 and 2, an annular fluid-tight casing 3 secured to the shaft 2, as by the splined connection 2ª, for rotation therewith, and a rotor unit centered with the casing 3 and including diametrically opposed radially extending rotor vanes 4 each carried by a side gear of a differential gearing mechanism 5. The differential gearing mechanism 5 is supported on the shaft 1, which is free to rotate relative to the casing 3, as by reason of the stuffing box 1a. The casing 3 includes parallel end walls 6 and 7 each provided with a plurality of radially extending, inwardly directed fixed vanes 8 and 9, respectively, these vanes being arranged as seen in Fig. 5. The rotor vanes 4 extend closely adjacent to the edges of the casing vanes 8 and 9 so as to cooperate therewith, when there is relative rotary motion between the rotor unit and the casing, to form a fluid coupling, the casing being filled with a suitable hydraulic fluid.

An annular dual friction clutch 10 is arranged to couple the rotor unit to the casing, so establishing a solid coupling between the shafts 1 and 2, and comprises stationary annular friction elements 11 and 12 secured respectively to annular enlargements 13 and 14, respectively, of the casing end walls 6 and 7. Carried by the shafts 15 of the rotor vanes 4, and rotatable with the rotor as a unit, are a pair of annular clutch elements 16 and 17 movable longitudinally of the shafts 1 and 2 into and out of engagement with the friction members 11 and 12. The movable clutch elements 16 and 17 are provided on their backs with annular recesses 18 and 19, respectively, in which are engaged the clutch actuating cams 20, these cams being connected to the rotor vane shafts 15. The clutch elements 16 and 17 are biased into disengaged position by the tension springs 21, and are also interconnected by pins 22 carried on the element 16 and slidable in tubes 23 carried on the element 17. In order to prevent relative rotational slippage between the movable clutch elements and the rotor vanes 4 and their shafts 15, yokes 24 are provided on one of the movable clutch elements and embrace the shafts 15. Thus, the movable elements of the friction clutch 10 rotate with the rotor unit, are normally held disengaged from the relatively stationary clutch elements 11 and 12, and are capable of being brought into engagement with the clutch elements 11 and 12, to provide direct coupling between the rotor and the casing, by rotation of the cams 20.

The differential gearing 5 comprises a pair of opposed bevel gears 25 and 26, the gear 25 being secured to the shaft 1 for rotation therewith, and the gear 26 being journalled on the plain bearing 27 carried by the shaft 1. Therefore, while the gear 25 must always rotate with the shaft 1, the gear 26 is free to turn relative thereto. Gears 25 and 26 are interconnected by side gears 28, each side gear being affixed to one of the rotor vane shafts 15. Thus, it will be clear that, since the side gears 28 and the gear 26 may rotate, the rotor vanes 4 may turn about their longitudinal axes, and the amount of such turning will be determined by the rotational position of the gear 26 relative to the shaft 1. As will be explained, it is desirable that the vanes 4 have a normal or starting position which is at an angle to the central axis of the casing, as indicated by full lines in Fig. 2 and dotted lines in Fig. 4. To accomplish this, the gear 26 is provided with resilient biasing means, as illustrated in Fig. 5. Here, it will be seen that the bearing 27 is provided with ears 29 and 30, while the gear 26 is provided with similar ears 31 and 32. Engaged between the ears 29 and 31 and the ears 30 and 32, respectively, are compression springs 33 and 34. Since the bearing 27 is fixed to the shaft 1, the springs 33 and 34 tend to maintain the gear 26 in an initial definite position and, as shown in Fig. 2, the gearing is so arranged that for this initial definite position of the gear 26 the vanes 4 are somewhat angularly displaced relative to the vanes 8 and 9 of the casing.

The casing 3 is made in two halves, secured together by bolts 35 or the like. Each half of the casing is provided with an inwardly directed annular flange or hub 36, at the inner end of the fixed vanes 8 and 9.

In order to support the inner ends of the shafts 15 and the gears 28, I provide a bearing ring 37, surrounding the gears. Each shaft 15 passes radially through and is journalled in this ring, and each of the gears 28 is provided with a hub forming a shoulder 38 which engages the inside of the ring, and thus constitutes a thrust bearing.

Operation of the clutch is as follows: By reason of the compression springs 33 and 34, Fig. 5, the gear 26 is biased to an initial position such that the rotor blades are angularly displaced as seen in Fig. 2. Tension springs 21 maintain the friction clutch 10 initially disengaged. Assume the shaft 1 to be the power input shaft, and the driving means such as to rotate shaft 1 in the direction of the arrow in Fig. 1. If the initial speed and torque are low, the fluid coupling comprising the rotor vanes 4 and the vanes 8 and 9 of the casing will offer little hydraulic resistance, the rotor unit, including the vanes 4 and the entire differential gearing 5, will turn relatively freely with the shaft 1, without relative rotation between the gear 25 and the side gears 28, and the vanes 4 will maintain their angularly displaced positions. As the speed increases, the hydraulic resistance in the fluid coupling will also increase, so that there is progressively greater resistance to rotation of the rotor unit as a whole. At a point dependent upon the strength of the compression springs 33 and 34, the resistance will be sufficient to cause the side gears 28 to rotate through a small angle, turning the gear 26 against the biasing face of the springs and turning the vanes 4 about their axes toward positions wherein they lie in axially disposed radial planes capable of coinciding with those of the vanes 8 and 9, as seen in full lines in Fig. 4. Of course, the closer the vanes 4 approach the position shown in Fig. 4, the greater will be the hydraulic resistance in the fluid coupling, and the greater will be the tendency to turn the side gears 28 and so further turn the vanes 4 about their longitudinal axes.

The cams 20, carried by the shafts 15, are elliptical and, when the clutch elements are in starting position, with the vanes 4 slightly displaced as seen in Fig. 2, the cams 20 are positioned with their short axes lying transversely of the movable clutch elements 16 and 17, as seen in Fig. 7. Thus, rotation of the vanes 4 about their longitudinal axes, as just described, will move the cams 20 from the position shown in Fig. 7 to the position shown in Fig. 6, causing the cams to force the movable clutch elements 16 and 17 into engagement with the corresponding clutch elements 11 and 12 secured to the casing 3.

Thus, the differential gear mechanism 5 operates in response to increasing torque and speed, as manifested by the increasing hydraulic resistance in the fluid coupling, to rotate the vanes 4 from the initial position of Fig. 2 to the final position of Fig. 4. And, as the vanes are so rotated, the cams 20 actuate the friction clutch 10 from its normally disengaged position, Fig. 7, to fully engaged position, Fig. 6. The torque increase above zero torque necessary to thus cause engagement of the frictional clutch 10 will, of course, depend upon the strength of the biasing springs 33 and 34.

Upon reduction of torque, the operation described will be reversed to disconnect the friction clutch 10 and establish a full slip condition. This occurs because, as soon as the torque decreases, with resultant decrease in resistance within the fluid coupling, the biasing springs 33 and 34 function to return the side gears 28 and the vanes 4 to their initial positions, so that the cams 20 are rotated from the positions shown in Fig. 6 to those shown in Fig. 7, and the springs 21 act to draw the movable clutch elements 16 and 17 out of engagement with the clutch elements 11 and 12.

Thus, when the device is employed in automotive applications, it has the advantage of providing substantially total slip when the vehicle is at rest, so that a conventional or automatic speed-change transmission may be employed, providing automatic engagement to direct drive in response to increasing speed and torque, and further providing automatic return to full slip condition either for free wheeling purposes or for purposes of shifting gears.

While only two sets of side gears 28, rotor vanes 4 and clutch actuator cams 20 have been described and shown, it will be clear that, on the one hand, only one side gear, vane and cam may be employed, with the rotor unit then suitably counterbalanced, or more than two side gears, rotor vanes and cams may be employed, as required by the particular application. Also, while the rotation of only one of the vanes 4 about its longitudinal axis has been described, it will be understood that, in the mechanism shown, the diametrically opposed rotor vanes turn about their axes in opposite direction, by reason of the nature of the differential gearing 5.

What I claim is:

1. In an automatic clutch for establishing a driving connection between two shafts, the combination of an annular fluid-tight casing secured to one of said shafts for rotation therewith and including a plurality of radially extending inwardly directed vanes; a rotor unit connected to the other of said shafts and including a plurality of radially extending vanes cooperating with the vanes of said casing to form a fluid coupling, said rotor vanes being mounted for rocking movement about their longitudinal axes and being resiliently biased to an initial angular position; means combined with said rotor for automatically causing said rotor vanes to turn about their longitudinal axes away from said initial angular position as the resistance in said fluid coupling against rotation of said rotor as a unit increases; a friction clutch connecting said rotor to said casing and being normally biased to disengaged position, and cam means movable with said rotor vanes for causing said friction clutch to engage when said rotor vanes are rotated about their longitudinal axes from said initial position.

2. In an automatic clutch for establishing a driving connection between two shafts, the combination of an annular fluid-tight casing secured to one of said shafts for rotation therewith and including a plurality of radially extending inwardly directed vanes; a rotor unit connected to the other of said shafts and including a plurality of radially extending vanes cooperating with the vanes of said casing to form a fluid coupling, said rotor unit including differential gearing allowing said rotor vanes to rotate about their longitudinal axes and also including resilient biasing means incorporated in said differential gearing and arranged to resist such rotation of said rotor vanes; a friction clutch for connecting said rotor unit and said casing, and cam means rigid with said rotor vanes for causing said friction clutch to engage when said rotor vanes are rotated about their longitudinal axes against the force of said resilient biasing means.

3. In an automatic torque responsive clutch for establishing a driving connection between two shafts, the combination of an annular fluid-tight casing secured to the first of said shafts for rotation therewith, said casing being provided with a plurality of radially extending inwardly directed vanes; differential gear mechanism centered within said casing and including two opposed bevel gears interconnected by a side gear, one of said opposed bevel gears being connected to the second of said two shafts for rotation therewith and the second of said gears being mounted for free turning movement relative to said second shaft but provided with resilient means biasing the same to an initial position; a rotor vane secured to said side gear and extending outward therefrom radially relative to said casing to cooperate with said first mentioned vanes, forming a fluid coupling; a friction clutch including a pair of opposed clutch elements, one of said clutch elements being carried by said casing and the other being carried by said rotor vane, said clutch being biased to disengaged position, and means responsive to rotation of said other gear from its initial position for causing said clutch to engage.

4. In an automatic torque responsive clutch for establishing a driving connection between two shafts, the combination of an annular fluid-tight casing secured to the first of said shafts to rotate therewith, said casing being provided with a plurality of radially extending inwardly directed vanes; differential gear mechanism centered within said casing and including two opposed bevel gears interconnected by a plurality of side gears, one of said opposed bevel gears being connected to the second of said two shafts for rotation thereby and the other of said gears being mounted for free turning movement relative to said second shaft but provided with resilient means biasing the same to an initial position; a rotor vane unit comprising a plurality of radially extending vanes each carried by and extending outwardly from one of said side gears to cooperate with said first mentioned vanes, forming a fluid coupling; a friction clutch including a pair of opposed annular clutch elements, one of said elements being carried by said casing and the other being carried by said rotor vane unit, said clutch being biased to disengaged position, and means responsive to rotation of said other gear from its initial position for causing said clutch to engage.

5. In an automatic torque responsive clutch for establishing a driving connection between two shafts, the combination of an annular fluid-tight casing secured to the first of said shafts for rotation therewith, said casing being provided with a plurality of radially extending inwardly directed vanes; differential gear mechanism comprising two coaxially aligned opposed bevel gears interconnected by a plurality of side gears, one of said opposed bevel gears being connected to the second of said shafts for rotation therewith and the other of said opposed bevel gears being free to turn relative to said second shaft, and resilient means biasing said second bevel gear to an initial position; a rotor unit including a rotor vane secured to each of said side gears and extending outwardly therefrom radially relative to said casing; an annular friction clutch element carried by said rotor at the ends of said rotor vanes; an annular friction clutch element opposed to said first clutch element and carried by said casing; means biasing said clutch elements to disengaged position, and cam means carried by said rotor vanes for causing said clutch elements to engage in response to angular displacement of said side gears caused by rotation of said other bevel gear relative to said second shaft from its initial position.

6. In an automatic torque responsive clutch, the combination of first and second aligned shafts; an annular fluid-tight casing secured to said first shaft for rotation therewith and including a plurality of radially extending inwardly directed vanes, said second shaft extending into said casing but being normally free to rotate relative thereto; differential gear mechanism comprising first and second opposed bevel gears interconnected by a plurality of side gears, said first gear being secured to said second shaft for rotation therewith and said second gear being journaled on said second shaft; resilient means interconnecting said second gear and said second shaft and biasing said second gear to an initial position relative to said shaft; a plurality of rotor vanes disposed radially of said casing and each carried by one of said side gears; an annular friction clutch normally biased to disengaged position and comprising a clutch element carried by said rotor vanes and a second clutch element carried by said casing, and cam means carried by said rotor vanes for causing said friction clutch to engage when said second gear is rotated on said second shaft from its initial position against the biasing force of said resilient means.

7. In an automatic torque responsive clutch, the combination of first and second aligned shafts; an annular fluid-tight casing secured to said first shaft and having parallel end walls, said end walls being provided with a plurality of radially extending inwardly directed vanes; differential gear mechanism carried by said second shaft and centered within said casing, said gear mechanism comprising two coaxially aligned opposed bevel gears interconnected by a plurality of side gears, one of said opposed bevel gears being secured to said second shaft for rotation therewith and the other of said opposed bevel gears being free to turn on said second shaft and resilient means biasing said other bevel gear to an initial rotational position; a plurality of rotor vanes each carried by one of said side gears and extending radially outward between the vanes of said casing end walls to cooperate therewith to form a fluid coupling; an annular friction clutch comprising a first clutch element carried by an end wall of said casing and a second clutch element opposed to said first element and carried by said rotor vanes, said second clutch element being mounted for movement axially of said shafts; resilient means biasing said second clutch element to a position in which the same is disengaged from said first clutch element, and cam means connected to said rotor vanes and arranged to move said second clutch element into engagement with said first clutch element when said rotor vanes are turned about their longitudinal axes as said other opposed bevel gear is rotated on said second shaft from its initial position against the force of said first mentioned resilient biasing means.

8. In an automatic torque responsive clutch, the combination of first and second aligned shafts; an annular fluid-tight casing secured to said first shaft and having parallel end walls, said end walls being provided with a plurality of radially extending inwardly directed vanes; differential gear mechanism carried by said second shaft and centered within said casing, said gear mechanism comprising first and second opposed bevel gears on said second shaft and interconnected by a plurality of side gears, said first bevel gear being secured to said second shaft to rotate therewith and said second bevel gear being journaled on said second shaft and provided with resilient means biasing the same to an initial position; a plurality of rotor vanes each carried by one of said side gears and extending radially of said casing outward between the vanes of said casing end walls, cooperating therewith to form a fluid coupling tending to resist rotation of said second shaft; a dual friction clutch comprising a pair of annular stationary clutch elements carried one on the inner surface of each casing end wall and a pair of annular clutch elements mounted on said rotor vanes for movement longitudinally of said shafts into engagement with the clutch elements carried by said casing, said clutch also including resilient means biasing said movable clutch elements into disengaged position, and a plurality of clutch actuating cams each carried by one of said rotor vanes and arranged to actuate said movable clutch elements into engaged position in response to rotary motion of said side gears caused by rotation of said second bevel gear on said second shaft from its initial position against the biasing force of said first mentioned resilient means.

EARL W. BROWN.

References Cited in the file of this patent

UNITED STATES PATENTS

| Number | Name | Date |
|---|---|---|
| 1,129,720 | Patterson | Feb. 23, 1915 |
| 1,304,566 | Hornbrook | May 27, 1919 |
| 1,858,514 | Lell | May 17, 1932 |
| 2,032,966 | Yoxall | Mar. 3, 1936 |

FOREIGN PATENTS

| Number | Country | Date |
|---|---|---|
| 356,798 | Great Britain | Mar. 3, 1931 |